United States Patent [19]

Deguchi et al.

[11] Patent Number: 4,497,006
[45] Date of Patent: Jan. 29, 1985

[54] MAGNETO-OPTIC RECORDING/PLAYBACK HEAD ASSEMBLY

[75] Inventors: Toshihisa Deguchi, Nara; Kenji Ohta, Yao; Akira Takahashi, Nara, all of Japan

[73] Assignee: Sharp Kabushiki Kaisha, Osaka, Japan

[21] Appl. No.: 345,056

[22] Filed: Feb. 2, 1982

[30] Foreign Application Priority Data

Feb. 6, 1981 [JP] Japan ................................. 56-17116

[51] Int. Cl.³ .............................................. G11B 5/32
[52] U.S. Cl. ..................................... 360/114; 365/122
[58] Field of Search ......................... 360/114; 365/122

[56] References Cited

U.S. PATENT DOCUMENTS 3,838,907 10/1974 Enz ....................................... 365/122
4,409,631 10/1983 Matsumoto ........................... 360/114

Primary Examiner—Bernard Konick
Assistant Examiner—Paul Stefanski
Attorney, Agent, or Firm—Birch, Stewart, Kolasch & Birch

[57] ABSTRACT

There is disclosed a head assembly for use in a magneto-optic recording/playback system which includes a memory medium having a magnetic coating having a magnetic anisotropy in a vertical direction. A light beam is applied to the memory medium for recording and reproduction of information. The head assembly includes a polarizing prism and a Faraday effect element in an optical path for the light beam. There is needed only the single polarizer.

4 Claims, 6 Drawing Figures

PRIOR ART
Fig. 1
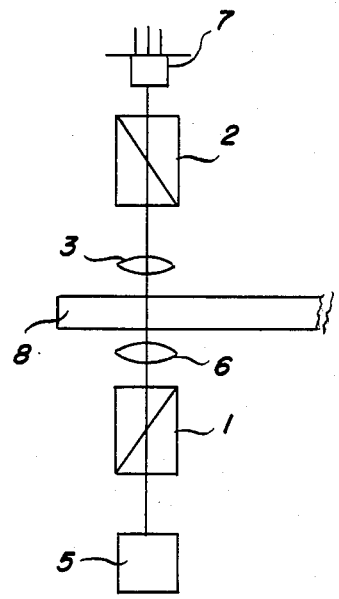
PRIOR ART
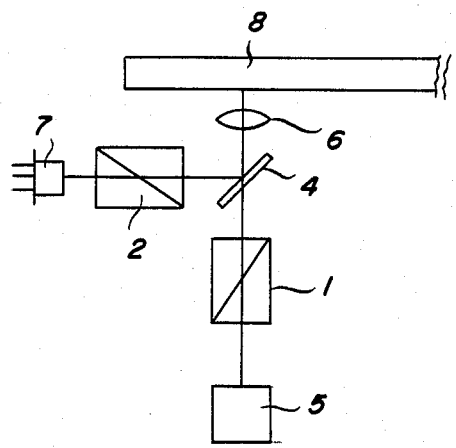
Fig. 2
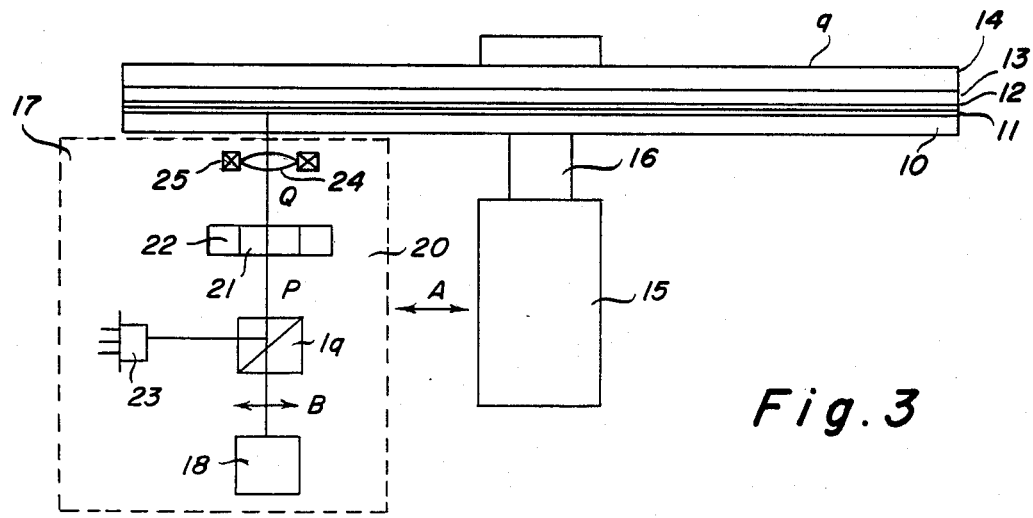
Fig. 3

MAGNETO-OPTIC RECORDING/PLAYBACK HEAD ASSEMBLY

BACKGROUND OF THE INVENTION

This invention relates to a recording/playback head assembly for use in a magneto-optic memory device wherein light beam such as a laser beam is applied to a magneto-optic memory medium having its easy axis of magnetiziation lying in a direction perpendicular to the medium plane to increase the temperature of a laser-affected portion and reduce retentiveness at that portion and magnetic domains are aligned along a magnetic field working at that portion for recording and erasure of information and a magneto-optic effect is relied upon for playback of information.

In recent years, a substantial amount of effort has been directed toward the development of an optical memory medium which satisfies various requirements including high density, large capacity and high speed access. Various optical memory systems have been put into practical use: for example, a system where a plurality of arrays of minute pits are formed in a memory disc and playback is carried out through the utilization of light beam diffraction taking place at those pits and a system where playback is effected using variations in reflection factor. However, those systems are capable only of reproducing information or recording additional information. An optical memory system which has capability of erasing information is still in the stage of research and development.

OBJECT AND SUMMARY OF THE INVENTION

Accordingly, it is an object of the present invention to provide a magneto-optic memory system which is capable of recording, reproducing and erasing information.

It is another object of the present invention to provide a magneto-optic memory system which is compact and simple in structure.

Pursuant to the present invention, the above objects are accomplished by providing a head assembly for use in a magneto-optic recording/playback system where a memory medium having a magnetic coating having a magnetic anisotropy in a vertical direction is used and a light beam is applied to the memory medium for recording and reproduction of information, said head assembly comprising a polarizing prism and a Faraday effect element in an optical path for said light beam.

BRIEF DESCRIPTION OF THE DRAWINGS

FIGS. 1 and 2 are schematic views of conventional magneto-optic recording/playback head assemblies;

FIG. 3 is a schematic view of a magneto-optic recording/playback head assembly constructed according to an embodiment of the present invention, which is incorporated into a disc drive;

DETAILED DESCRIPTION OF THE INVENTION

Figure 4:
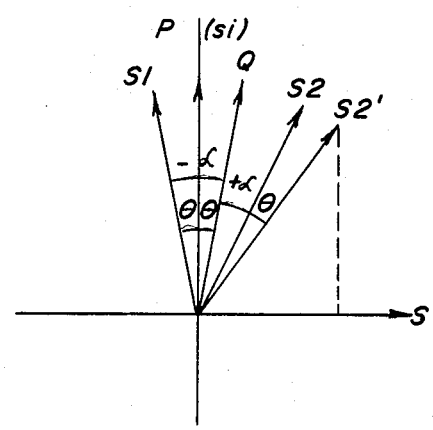
FIG. 4 is a diagrammatic illustration for explanation of the principle of information reproduction of the magneto-optic recording/playback head assembly according to the present invention.

FIGS. 1 and 2 illustrate conventional magneto-optic reproducing/playback head assemblies. A transmission type head is illustrated in FIG. 1 and a reflection type head is illustrated in FIG. 2. As is clear from FIGS. 1 and 2, the conventional head assemblies demand a polarizer 1 and a detector 2 and especially the transmission type head assembly of FIG. 1 should include a lens 3 for focusing a light beam carrying information onto a photo sensor 7 and the reflective head assembly of FIG. 2 should include a half-mirror 4 or the like for leading to the photo sensor information-carrying light reflected from a surface of a memory medium, thus resulting in a complex structure. The light beam passes through a plurality of those optical elements before it reaches the photo sensor and therefore undergoes distorted polarization and a downgraded SN ratio during reproduction. Further, the problem arises with the reflective head assembly that the half mirror impairs utility efficiency of light power. In FIGS. 1 and 2, there are further provided a laser 5, an iris lens 6 and a magnetic disc 8.

According to the present invention, a head assembly is provided which is free of the above discussed problems and compact and simple in structure through the use of a polarizing prism and a Faraday effect element.

FIG. 3 shows a magneto-optic disc system which includes a magneto-optic recording/playback head assembly embodying the present invention. A magneto-optic memory disc 9 comprises in a laminated structure a transparent disc-like base 10 typically made of transparent plastic material or transparent glass material, a thin-film magnetic coating 11 having its easy axis of magnetization in a direction perpendicular to a plane of the disc-like base 10 and disposed in a well known manner such as vacuum deposition and sputtering, an anti-thermal diffusion coating 12 overlying the magnetic coating 11 and typically made of dielectric material such as $SiO_2$, a reflective coating 13 typically made of metal such as Al, Au and Cu, and a disc-like reinforcing plate 14. Especially, it is preferable that the magnetic coating 11 be made of an amorphous magnetic material including a combination of rare earth metal Gd, Tb, Dy and Sm and transition metal such as Fe, Co and Ni. Typical material for the magnetic coating 11 is GdTbFe, GdDyFe, TbDyFe or TbFe. It is also obvious that the magnetic coating 11 may be made of a crystalline magnetic material such as MnBi, MnBiCu and MnAlGe.

The magnetic disc 9 is disposed in a horizontal direction, with the magnetic coating 11 thereof facing downwardly, and in such a way that its center is located in alignment with an output shaft 16 of a drive motor 15. The magnetic disc 9 is driven at a fixed speed by the motor 15.

A magneto-optic recording/playback head assembly 17 includes an optical system, a magnetic field source and a photo sensor for magnetic recording, reproduction and erasure. The head assembly is designed to move along the radial direction of the magnetic disc by a drive system (not shown) while being spaced at a fixed distance from a surface of the disc.

Within the head assembly 17 there is housed a laser unit for generating a light beam modulated with information to be recorded or one of a fixed intensity. For example, the laser unit comprises a semiconductor laser diode and a modulator circuit and is designed to emit a linearly polarized light beam oscillating the direction of the arrow B in the drawing sheet. A polarizing beam splitter 19 is designed to convey the laser beam from the laser unit 18 toward the disc without power loss and lead into the photo sensor only a component of the polarized light oscillating in the direction perpendicular to the plane of the drawing out of reproduction light reflected from the disc. A way to make the polarizing beam splitter 19 is to prepare two rectangular prisms made of an optical glass material such as BK7, dispose multi-layered dielectric coatings on the respective slant surfaces of one of the rectangular prisms and adhere the remaining prism to said one prism having those coatings. Another preferred material for the splitter is a so-called Glan type prism which is a crystal having double refraction such calcite.

Figure 5A:
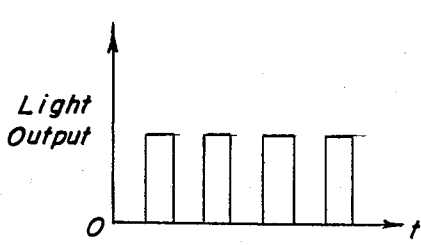
FIGS. 5(a) and 5(b) are waveform diagrams of exemplary signals reproduced by a magneto-optic effect.
Figure 5B:
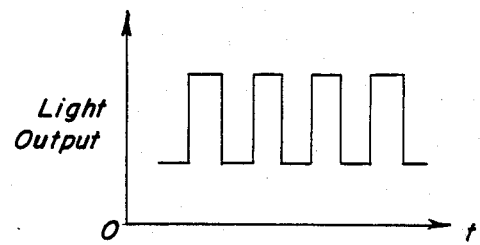

A Faraday effect element 20 is set up by a paramagnetic material 21 having transparency to the laser beam, for example, a Faraday glass plate such as FR-5 and a cylindrically-shaped hollow permanent magnet 22 for developing a magnetic field in a direction parallel with propagation of the laser beam. The function of the Faraday effect element 20 will be more clearly understood from FIG. 4. Linear polarization P running through the polarizing beam splitter 19 undergoes an effect afforded by the Belde constant Be of the paramagnetic material 21 and the magnetic field H and takes the form of linear polarization Q whose plane of polarization is rotated by $\theta(°) = Be(\min/cm\cdot Öe) \times H(Öe) \times 1(cm)$ wherein 1 is the length of the paramagnetic material. Provided that this linear polarized light Q is reflected from the disc 9, reflected light from upwardly magnetized regions of the magnetic coating 11 takes in the form of polarized light $S_2$ with a rotation angle $\alpha$ (Kerr rotation angle) and reflected light from downwardly magnetized regions thereof changes into polarized light $S_1$ with an angle $-\alpha$ of rotation due to a magneto-optic effect (so-called Kerr effect). When these reflected light beams pass through the Faraday effect element 20, the plane of polarization further rotates by $\theta$. Assuming the Faraday effect element 20 is selected with $\theta = \alpha/2$, the planes of polarization of the reflected light beams lie at $S_1'$ and $S_2'$. If the polarized light beams $S_1'$ and $S_2'$ are incident on the polarizing light splitter 19, then only the components S of both the polarized light beams are led to a photo sensor 23 so that reproducing light is available with an amplitude modulated as a function of information as seen from FIG. 5(a). However, as a matter of fact, the reflected light beams $S_1'$ and $S_2'$ undergo cancellation of polarization to a certain extent and changes into elliptically polarized light. A signal output at the moment is illustrated in FIG. 5(b). An iris lens 24 is provided to focus the light beam emitting from the laser unit 18 onto minute regions of the magnetic coating 11 on the magnetic disc 9. An excitation coil 25 is wound about the iris lens 24 and energized during recording and erasure to develop magnetic fields of opposite polarities, respectively, for the laser-illuminated regions. The photo sensor 23 typically made of a PIN semiconductor device and adapted to receive the light beams reflected from the polarizing light beam splitter 19 for reproducing the information stored on the memory disc.

Recording, reproduction and erasure will be carried out on the disc system as described above. The magneto-optic recording/playback head assembly 17 is located in place beneath the magnetic disc 9 and moved in a rectilinear fashion along a radial direction of the magnetic disc 9 by a drive device (not shown) during recording, reproduction and erasure. Further, the magnetic disc 9 is driven by the motor 15 to rotate at a fixed speed.

I. Recording

The laser unit 18 emits a modulated beam or linearly polarized light (denoted by the arrow B) oscillating in the plane of the drawing sheet and having an amplitude modulated according to information. The laser beam impinges in a spot-like form on the magnetic coating 11 on the magnetic disc 9 by way of the polarized beam splitter 19, the Faraday effect element 20 and the iris lens 24. The excitation coil 25 is supplied with a voltage to produce a magnetic field running in a direction perpendicular to the magnetic disc 9. The point where the modulated laser beam is incident receives heat energy and shows a temperature rise and a decline in retentiveness $H_c$ proportional to the amplitude of the modulated beam. Magnetic domains at only those spotted portions where $H_w > H_c$ is satisfied, wherein $H_w$ represents the write-in magnetic field generated by coil 25, invert their mangnetization in a direction opposite that in the initial domains of the magnetic coating 11. Those spotted portions shift concentrically or spirally on the plane of the magnetic coating 11 of the magnetic disc 9 as the magnetic disc 9 rotates and the head assembly 17 moves straight. For example, assuming the modulated beam bears a train of information bits "1011 . . . ", the portions corresponding to "1"'s invert their magnetization and those corresponding to "0"'s still hold their initial magnetic domains. Information is recorded in such a manner that the oppositely magnetized portions are aligned concentrically or spirally.

II. Reproduction

A laser beam of a given amplitude is emitted from the laser unit 18 and the photo sensor 23 is turned on. The laser beam takes the form of linearly polarized light through the polarized beam splitter 19 and undergoes rotation of its polarization plane by a predetermined angle through the Faraday effect element 20. The polarized beam runs through the iris lens 24 and irradiates in a spot-like form the magnetic coating 11 on the magnetic disc 9. The laser-irradiated portions shifts coeccentrically or spirally on the magnetic coating 11 in the same manner as described above. The polarized beam incident on the spotted portions is reflected in the form of polarized light with an angle of rotation, that is, a Kerr rotation angle according to the magnetized state of those portions. The reflected beam shows rotation of $+\alpha$ of its plane of polarization for the information bits "1" and rotation of $-\alpha$ for the information bits "0". The plane of polarization of the reflected light further rotates through the Faraday effect element 20 and reaches the splitter 19. As is clear from FIG. 4 illustrating the reproduction principle, the laser beam incident on the photo sensor 23 is one whose amplitude is modulated according to information.

III. Erasure

The laser beam of the same amplitude as in recording is emitted from the laser unit 18 without modulation and the excitation coil 25 is energized in a direction opposite that during recording. The resultant magnetic field is applied to the magnetic disc 9. The laser beam impings in a spot-like form on the magnetic coating 11 on the magnetic disc 9 through the splitter 19, the Faraday effect element 20 and the iris lens 24. The laser-irradiated portions of the magnetic coating 11 show a temperature rise and a decrease in retentiveness $H_c$. Due to the magnetic field forcedly applied from the excitation coil 25 those portions invert its magnetization in a direction different from that during recording and therefore erase information recorded therein. It is possible to selectively erase undesired information bits by amplitude modulating the laser beam emitted from the laser unit 18.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A head assembly for use in a magneto-optic recording/playback system, said system including a memory medium having a magnetic coating having a magnetic anisotropy in a vertical direction and wherein a light beam is applied to the memory medium for recording and reproduction of information, said head assembly comprising a polarizing prism and a Faraday effect element comprising a glass plate in an optical path for said light beam.

2. The head assembly of claim 1, wherein said Faraday effect element comprises a glass plate having an amorphous molecular structure.

3. The head assembly of claim 1, wherein said Faraday effect element comprises a glass plate surrounded by a cylindrical magnet.

4. The head assembly of claim 3, wherein said magnet develops a magnetic field in a direction parallel to said path.

* * * * *